United States Patent [19]

Nakamura

[11] Patent Number: 4,804,874

[45] Date of Patent: Feb. 14, 1989

[54] ELECTROMAGNETIC CLUTCH

[75] Inventor: Hiroaki Nakamura, Ise, Japan

[73] Assignee: Shinko Electric Co., Ltd., Tokyo, Japan

[21] Appl. No.: 60,216

[22] Filed: Jun. 10, 1987

[30] Foreign Application Priority Data

Jun. 13, 1986 [JP] Japan .................. 61-90043[U]

[51] Int. Cl.$^4$ ............................................ H02K 49/00
[52] U.S. Cl. ............................................ 310/92; 310/44; 310/78; 310/96; 310/98; 192/110 R; 464/182
[58] Field of Search ................... 310/42, 92, 93, 96, 310/97, 99, 100, 78, 43, 44, 261–265; 192/2, 30 R, 66, 84 A, 84 B, 84 C, 110 R, 110 B, 110 S; 403/332, 345, 355, 356, 361; 464/179, 182, 183

[56] References Cited

U.S. PATENT DOCUMENTS

| | | | |
|---|---|---|---|
| 2,134,795 | 11/1938 | Myers | 310/44 X |
| 2,834,895 | 5/1958 | Papst | 310/44 |
| 3,465,181 | 9/1969 | Colby et al. | 310/44 |
| 3,668,445 | 6/1972 | Grove | 310/44 X |
| 3,872,334 | 3/1975 | Loubier | 310/44 X |
| 4,250,421 | 2/1981 | Masuda et al. | 310/44 X |
| 4,727,974 | 3/1988 | Takatoshi | 310/92 X |

Primary Examiner—Mark O. Budd
Attorney, Agent, or Firm—Kane, Dalsimer, Sullivan, Kurucz, Levy, Eisele and Richard

[57] ABSTRACT

An electromagnetic clutch of the type which includes a rotor secured around a rotation shaft, a drive member rotatably mounted around the rotation shaft, an armature mounted through a resilient member to the drive member with a gap to the rotor, a bearing mounted around the rotation shaft, a yoke mounted around the bearing for rotation about the rotation shaft, and the yoke locking mechanism for locking the yoke to a frame so as to prevent the yoke from accompanying the rotation shaft when the rotation shaft is rotated, the yoke having a coil wound therearound, and in which the rotor, the armature and the yoke are arranged to form a magnetic path so that the armature is electromagnetically attracted to the rotor for transmitting torque from the drive member to the rotation shaft when the coil is energized. The rotation shaft includes: a first sintered compact magnetic alloy shaft, the first shaft having the bearing fitted therearound; and a second sintered compact magnetic shaft, concentrically jointed to the first shaft for transmitting the torque to the first shaft, the second shaft having both the rotor and the drive member placed therearound.

6 Claims, 3 Drawing Sheets

ELECTROMAGNETIC CLUTCH

BACKGROUND OF THE INVENTION

The present invention relates to an electromagnetic clutch and relates particularly although not exclusively to an electromagnetic microclutches for use in automation appliances.

FIG. 1 illustrates a typical example of the conventional electromagnetic microclutch. This electromagnetic clutch has a hollow cylindrical rotor shaft 2 formed of a synthetic resin by molding. The rotor shaft 2 has a rotor 3, mounted around on it, and an annular yoke 4 rotatably mounted on it so as to be positioned on the left side in FIG. 1 with respect to the rotor 3. The rotor 3 has a boss 5 and a cup-shaped flange portion 6 concentrically and integrally formed with the boss 5, the flange portion 6 having an outer circumferential magnetic pole 6a and an inner circumferential magnetic pole 6b. The yoke 4 has a coil 7 and a yoke locking plate 8 welded to it. The yoke locking plate 8 is provided in its distal end with an engaging recess 8a into which a lock pin 9 fits. The lock pin 9 is attached at its proximal end to a frame 10 for keeping the locking plate 8 stationary, so that the yoke 4 is prevented from accompanying the rotor shaft 2 when the latter is rotated. A spur gear 11 rotatably fits around the rotor shaft 2 and is prevented from axial movement by both the boss 5 of the rotor 3 and a retaining ring 12 mounted to the rotor shaft 2. A ring-shaped armature 13 is fixed to the spur gear 11 through a ring-shaped spring plate 14 so that one face thereof faces to the inner and outer magnetic poles 6b and 6a with a small gap.

With such a construction, the armature 13 is rotated together with the spur gear 11 when a rotation force is transmitted from a drive mechanism (not shown), including an electric motor, to the spur gear 11. During the rotation of the armature 13, the coil 7 is energized for magnetizing the yoke 4, so that a magnetic flux passes the yoke 4, the outer circumferential magnetic pole 6a of the rotor 3, the armature 13 and the inner circumferential magnetic pole 6b and then returns to the yoke 4, thus forming a magnetic path $\phi_1$. The armature 13 is hence brought into contact with the magnetic poles 6a and 6b by magnetic attraction against the resilient force exerted by the spring plate 14, so that the rotation shaft 2 is rotated. When the coil 7 is deenergized, the armature 13 is separated from the rotor 3 by the resilient force of the spring plate 14, with the result that transmission of the torque from the spur gear 11 to the rotation shaft 2 is discontinued.

Such an electromagnetic clutch has the following problems in size reduction:

(a) Reduction in the outer diameter of the electromagnetic clutch decreases the space into which the coil 7 is received. This results in considerable reduction in the magnetomotive force of the coil 7.

(b) The rotor shaft 2 is molded of a synthetic resin in view of its rather complicated configuration and for cost reduction. Thus, the radial cross-sectional area of the magnetic path of the rotor shaft becomes smaller than in a magnetic rotor shaft for a given radial cross-sectional area of an electromagnetic clutch. This results in an increase in magnetic reluctance of the magnetic path $\phi_1$ and hence in necessity for a larger magnetomotive force of the coil.

(c) The synthetic resin rotor shaft is a hollow shaft into which a driven shaft having a predetermined outer diameter is inserted for interconnection and thus it has a lower limit in its thickness in view of strength, so that the radial size reduction of the electromagnetic clutch is rather limited. When the rotor shaft is made of an iron material, its machining cost is rather high as compared to that of the synthetic resin rotor shaft and thus considerably raises the production cost of the electromagnetic clutch.

Accordingly, it is an object of the present invention to provide an electromagnetic clutch which enables its size reduction with relatively small cost.

SUMMARY OF THE INVENTION

With this and other objects in view, the present invention provides an electromagnetic clutch of the type which includes a rotor secured around a rotation shaft, a drive member rotatably mounted around the rotation shaft, an armature mounted through a resilient member to the drive member with a gap to the rotor, a bearing mounted around the rotation shaft, a yoke mounted around the bearing for rotation about the rotation shaft, and the yoke locking mechanism for locking the yoke to a frame so as to prevent the yoke from accompanying the rotation shaft when the rotation shaft is rotated, the yoke having a coil wound therearound, and in which the rotor, the armature and the yoke are arranged to form a magnetic path so that the armature is electromagnetically attracted to the rotor for transmitting torque from the drive member to the rotation shaft when the coil is energized. The rotation shaft includes: a first sintered compact magnetic alloy shaft, the first shaft having the bearing fitted therearound; and a second sintered compact magnetic alloy shaft, concentrically jointed to the first shaft for transmitting the torque to the first shaft, the second shaft having both the rotor and the drive member placed therearound.

According to the present invention, the rotor shaft which is made of a compacted, sintered magnetic material allows a highly efficient magnetic path to be formed as compared to the prior art synthetic resin rotor shaft and thus, it enables reduction in size of both the coil and the yoke. Further, the rotor shaft according to the present invention may be reduced in thickness because of its high strength as compared to that of the synthetic resin rotor shaft.

DETAILED DESCRIPTION OF THE PREFERRED EMBODIMENT

Figure 2:
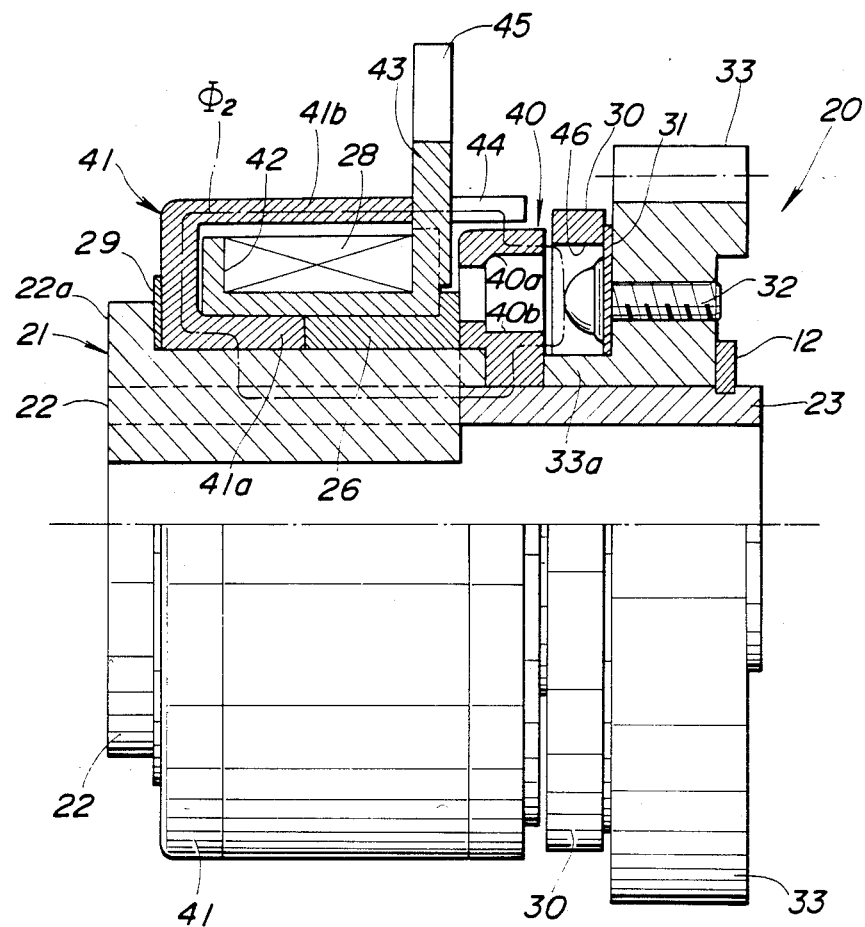
FIG. 2 is a side view, partly in radial section, of one embodiment of the present invention.
Figure 3:
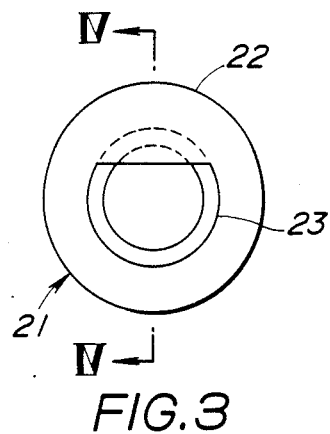
FIG. 3 is a left-hand end view, in a reduced scale, of the rotor shaft in FIG. 2.
Figure 4:
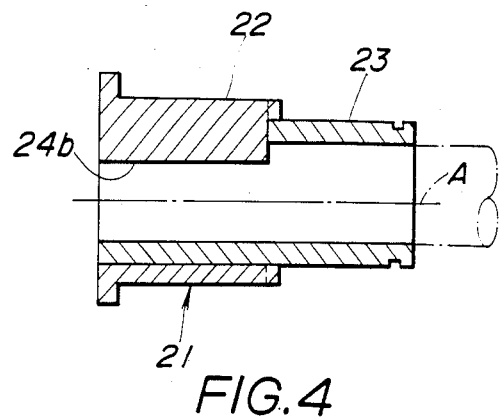
FIG. 4 is a view taken along the line IV—IV in FIG. 3.
Figure 5:
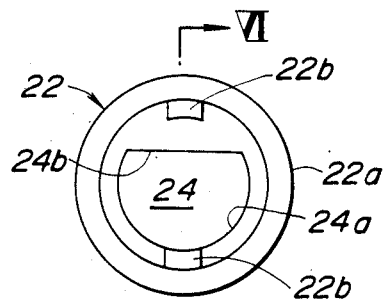
FIG. 5 is a right-hand end view, in a reduced scale, of the rotor boss in FIG. 2.
Figure 6:
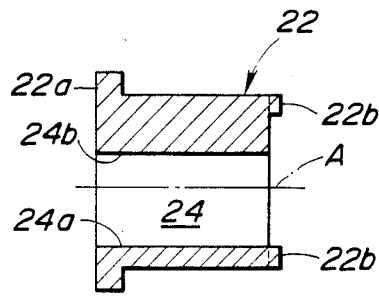
FIG. 6 is a view taken along the line VI—VI in FIG. 5.
Figure 7:
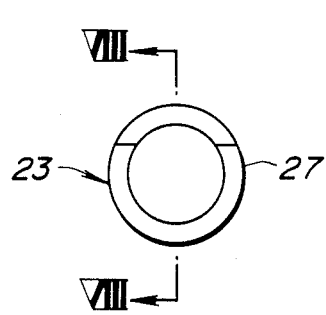
FIG. 7 is a left-hand end view, in a reduced scale, of the collar in FIG. 2.
Figure 8:
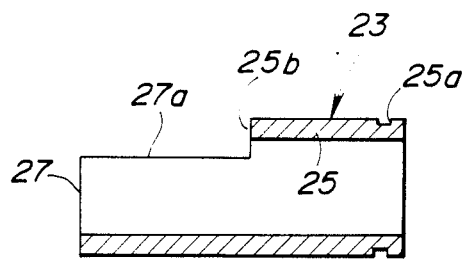
FIG. 8 is a view taken along the line VIII—VIII in FIG. 7.

Referring to FIG. 2, an electromagnetic clutch 20, constructed according to the present invention, includes a rotor shaft 21 which has a rotor boss 22 and a collar 23 fitted into the rotor boss 22. The rotor boss 22 is made of a conventional sintered magnetic ferroalloy and is manufactured by compression molding and then sintering the magnetic material. The collar 23 is also an oil-impregnated, sintered compact of another magnetic ferroalloy. As shown in FIGS. 5 and 6, the rotor boss 22 is in a generally hollow cylindrical shape and has a engaging hole 24 having a D-profile periphery axially passing through it. The engaging hole 24 is defined by both an arcuate wall 24a and a chord wall 24b. The rotor boss 22 has an annular flange 22a, formed at its one end to project radially outwards, and a pair of projections 22b and 22b formed at the other end to be located at an angular interval of 180° about its axis A for holding the collar between them. As illustrated in FIGS. 7 and 8, the collar 23 has a hollow cylindrical rotor mounting portion 25 and a C-profile connecting portion 27 integrally and coaxially formed with the rotor mounting portion 25, thus forming a pair of parallel axial edges 27a and 27a. The connecting portion 27 is formed so that it snugly fits into the engaging hole 24 of the rotor boss 22. The rotor mounting portion 25 has an annular retaining groove 25a into which a retaining ring 12 fits. The rotor boss 22 and the collar 23 are interconnected by fitting the connecting portion 27 into the rotor boss 22 as illustrated in FIG. 4. In this state, the inner edge 25b of the rotor mounting portion 25 is in abutment with the other end of the rotor boss 22, and the two parallel edges 27a and 27a of the connecting portion 27 are in contact with the chord wall 24b of the rotor boss 22.

Figure 1:
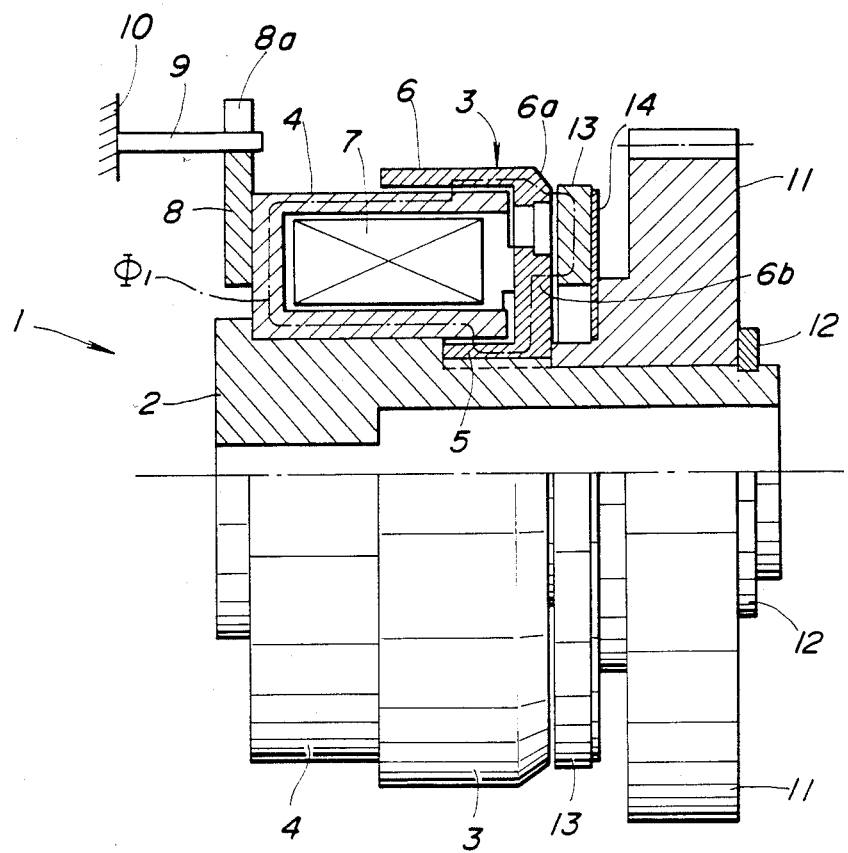
FIG. 1 is a side view, partly in radial section, of the conventional electromagnetic clutch.

The collar 23 has a generally disc-shaped rotor 40 mounted around it by a conventional key-keyway mechanism. The rotor 40 includes an outer circumferential magnetic pole 40a and an inner circumferential magnetic pole 40b, both the poles 40a and 40b being concentrically formed. Arranged on the left side in FIG. 2 with respect to the rotor 40 is a generally channel-shaped annular yoke 41 which includes an inner annual flange 41a and an outer annular flange 41b, both the flanges axially extending. The yoke 4 has a coil bobbin 42 mounted to the outer face of the inner annular flange 41a. The coil bobbin 42 slidably fits around an oilless bearing 26, which in turn slidably fits around the rotor boss 22, thus supporting the yoke 41 so as to be rotatable relative to the rotor boss 22. The coil bobbin 42 has a coil 28, wound around it, and an elongated yoke locking portion 43 which radially outwardly extends from it and passes through a through slot 44 formed in the distal edge of the outer annular flange 41b of the yoke 41. The yoke locking portion 43 has a through slot 45 formed through at its distal end, and although not shown in FIG. 2, a lock pin similar to the lock pin 9 (FIG. 1), which is mounted to the frame 10, engages the wall of the slot 45 for holding the yoke 41. A ring-shaped slider 29 is mounted around the rotor boss 22 and sandwiched between the left hand end in FIG. 2 of the yoke 41 and the annular flange 22a of the rotor boss 22 for smoothly sliding the rotor shaft 21. A spur gear 33 is slidably mounted around the collar 23 of the rotor shaft 21 and is prevented from axial movement by the retainer ring 12. A ring-shaped armature 30 is attached through a spring disc 31 to the spur gear 33 so that a small gap is formed between the rotor 40 and the armature 30. More specifically, the armature 30 has a plurality of fastening holes 46 formed through it although only one fastening hole 46 is shown in FIG. 2. The spring disc 31 fits around a hub 33a of the spur gear 33 and is fastened to the spur gear 33 by means of machine screws 32 which pass through fastening holes 46 of the armature 30.

When the coil 28 is energized, a magnetic path $\phi_2$ which passes through part of the rotor shaft 21 is formed, that is, the yoke 41, the rotor shaft 21, the inner magnetic pole 40b, the armature 30, the outer magnetic pole 40 and the yoke 41 form the magnetic path. Thus, the armature 30 is magnetically attracted to the rotor 40, so that torque is transmitted from the spur gear 33 to the collar 23 and then to the rotor boss 22.

In the embodiment, torque is transmitted from the spur gear 33 to the rotor shaft 21, but may be transmitted from the latter to the former.

What is claimed is:

1. In an electromagnetic clutch of the type which includes a rotor secured around a rotation shaft, a drive member rotatably mounted around the rotation shaft, an armature mounted through a resilient member to the drive member with a gap to the rotor, a bearing mounted around the rotation shaft, a yoke mounted around the bearing for rotation about the rotation shaft, and the yoke locking mechanism for locking the yoke to a frame so as to prevent the yoke from accompanying the rotation shaft when the rotation shaft is rotated, the yoke having a coil wound therearound, and in which the rotor, the armature and the yoke are arranged to form a magnetic path so that the armature is electromagnetically attracted to the rotor for transmitting torque form the drive member to the rotation shaft when the coil is energized, the improvement wherein the rotation shaft comprises: a first sintered compact magnetic shaft, the first shaft having the bearing fitted therearound; and a second sintered compact magnetic shaft, concentrically connected to the first shaft for transmitting the torque to the first shaft, the second shaft having both the rotor and the drive member placed therearound.

2. An electromagnetic clutch as recited in claim 1, wherein: the first shaft is in a hollow, generally cylindrical shape; the second shaft is in another hollow, generally cylindrical shape and has one end portion, the second shaft being concentrically fitted at the one end portion into the first shaft; the first shaft and the second shaft have formations detachably interengaged.

3. An electromagnetic clutch as recited in claim 2, wherein the second shaft is made of an oil impregnated magnetic alloy and the drive member is a toothed wheel directly placed around the second shaft.

4. An electromagnetic clutch as recited in claim 3, wherein the first shaft has an inner periphery having a non-circular cross-section; and the one end portion of the second shaft has an outer periphery complimentary in shape to the inner periphery of the first shaft, whereby the one end portion of the second shaft snugly fits into the first shaft.

5. An electromagnetic clutch as recited in claim 4, wherein: the inner periphery of the first shaft has a generally C-shaped cross-section, the inner periphery having an arcuate inner wall and a chord inner wall bridging the arcuate inner wall; the second shaft comprises a hollow cylindrical portion, and a C-profile connecting portion integrally and coaxially formed with the hollow cylindrical portion, the C-profile connecting portion forming the one end portion; and the C-profile connecting portion has a pair of parallel edges axially extending to the hollow cylindrical portion, the parallel edges being in contact with the chord inner wall of the first shaft.

6. An electromagnetic clutch as recited in claim 5, wherein: the hollow cylindrical portion of the second shaft has an outer peripheral wall; the first shaft has one end nearer to the hollow cylindrical portion; and the first shaft has a pair of projections formed at the one end for holding the outer peripheral wall of the hollow cylindrical portion of the second shaft.

* * * * *